United States Patent
Baik et al.

(10) Patent No.: US 7,054,112 B2
(45) Date of Patent: May 30, 2006

(54) HEAD DRUM ASSEMBLY FOR TAPE RECORDER AND METHOD OF MAKING SAME

(75) Inventors: Chung-hum Baik, Suwon-si (KR); Seung-woo Lee, Suwon-si (KR); Sung-hee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 10/678,069

(22) Filed: Oct. 6, 2003

(65) Prior Publication Data

US 2004/0066584 A1    Apr. 8, 2004

(30) Foreign Application Priority Data

Oct. 7, 2002    (KR) ................ 10-2002-0061087

(51) Int. Cl.
*G11B 5/52*    (2006.01)

(52) U.S. Cl. .................................. 360/271.2

(58) Field of Classification Search ............. 360/271.2, 360/271.6, 271.1; 384/517, 518
See application file for complete search history.

(56) References Cited

U.S. PATENT DOCUMENTS

| | | | | |
|---|---|---|---|---|
| 3,578,829 A | * | 5/1971 | Hata et al. | ................ 384/458 |
| 5,870,257 A | * | 2/1999 | Joe | ................ 360/281.3 |
| 5,949,620 A | | 9/1999 | Asai et al. | |

FOREIGN PATENT DOCUMENTS

| | | |
|---|---|---|
| CN | 1164730 A | 11/1997 |
| EP | 0 507 281 | 10/1992 |
| GB | 2 273 810 | 6/1994 |
| JP | 64-16163 | 1/1989 |
| JP | 2000-057544 | 2/2000 |

* cited by examiner

*Primary Examiner*—Robert S. Tupper
(74) *Attorney, Agent, or Firm*—Roylance Abrams Berdo & Goodman LLP

(57) ABSTRACT

Disclosed is a head drum assembly of a tape recorder. An elastic body is mounted between upper and lower bearings as preloading means, in which the upper and lower bearings are interposed between a rotary drum and the shaft. As a result, the elastic body elastically biases the inner races of the upper and lower bearings upwardly and downwardly, respectively, whereby preload can be applied to each of the upper and lower bearings.

15 Claims, 7 Drawing Sheets

HEAD DRUM ASSEMBLY FOR TAPE RECORDER AND METHOD OF MAKING SAME

PRIORITY

This application claims priority under 35 U.S.C. § 119 to an application entitled "Head Drum Assembly of a Tape Recorder" filed in the Korean Intellectual Property Office on Oct. 7, 2002 and assigned Serial No. 2002-61087, the contents of which are incorporated herein by reference.

BACKGROUND OF THE INVENTION

1. Field of the Invention

The present invention relates to a head drum assembly for a tape recorder such as a VCR or a camcorder, and in particular, to a method of preloading a head drum bearing in a head drum assembly of a tape recorder.

2. Description of the Related Art

In general, tape recorders such as VCRs and camcorders are provided with a head drum assembly that is mounted for high-speed rotation. This enables information to be recorded and reproduced by the scanning of a magnetic head in relation to a magnetic tape. As shown in FIG. 1, which is a partial cross-sectional schematic view of a head drum assembly, the head drum assembly comprises: a rotary drum 10 which rotatably supports a magnetic head H for recording/reproducing information by scanning a running magnetic tape; a fixed drum 20 which is press-fitted onto a lower part of a shaft 30 engaged in a central axial bore of the rotary drum 10; and an upper bearing 40 and a lower bearing 50 located one on the other and press-fitted between the rotary drum 10 and the shaft 30. In the drawing, reference numerals 1 and 2 indicate a rotor and a stator, respectively, and reference numeral 3 indicates a magnet mounted on the internal circumferential surface of the rotor 1.

The head drum assembly of a tape recorder with the above-mentioned construction is provided with preloading means for applying preload to the upper bearing 40 and the lower bearing 50, and the conventional bearing preloading means generally employs a preloading construction as shown in FIG. 1, in which a preloading boss 60 is provided above the upper bearing 40. A rib 70 is provided on the fixed drum 20 below the lower bearing 50, thereby applying preload to the bearings.

According to conventional bearing preloading construction, the preloading boss 60 is secured by a set screw S so that a projection formed in the preloading boss 60 downwardly compresses the internal race 41 (not shown) of the upper bearing 40. The rib 70 is made to upwardly compress the internal race 51 (not shown) of the lower bearing, thereby applying preload to the bearings.

Accordingly, the preloading construction of the conventional head drum assembly has a problem in that the preloading boss 60 and the set screw for securing the boss are additionally required components, thereby increasing the cost. In addition, there is also a problem in that, because it is not easy to determine the position for securing the preloading boss 60 when engaging the set screw S, it is difficult to precisely control the preload. This can lead to problems such as the generation of noise while driving the bearings.

Furthermore, according to the bearing preloading method and construction of the conventional head drum assembly, it is required that the head drum assembly be subjected to a heat treatment process (such as annealing) after the bearings are assembled. This removes thermal deformation caused by the excessive press-fitting of the bearings. Therefore, there is also a problem in that manufacturing productivity is lowered and the costs of manufacturing are increased.

SUMMARY OF THE INVENTION

An object of the present invention is to substantially solve at least the above problems and/or disadvantages and to provide at least the advantages described below. Accordingly, an embodiment of the present invention provides a head drum assembly for a tape recorder, comprising a shaft, a rotary drum which supports a magnetic head for recording and reproducing information by scanning a running magnetic tape, and a fixed drum, wherein the fixed drum is press-fitted onto a lower part of the shaft, engaged on an axial bore of the rotary drum, parallel to the rotary drum. The head drum assembly further comprises an upper bearing and a lower bearing, provided one on the other between the rotary drum and the shaft, the upper and lower bearings comprising an inner race, and a preload apparatus which applies a preload to the upper and lower bearings.

Another embodiment of the present invention provides a method for fabricating a head drum assembly of a tape recorder, comprising press fitting an upper bearing into an upper recess of a rotary drum, which supports a magnetic head for recording and reproducing information by scanning a running magnetic tape; press fitting a shaft through the upper bearing; inserting a preloading apparatus around the shaft adjacent to a lower surface of the upper bearing; press fitting a lower bearing around the shaft into a lower recess of the rotary drum, such that the preloading means is elastically biased against the upper and lower bearings; and press fitting a fixed drum around the shaft, lower bearing and rotating drum.

BRIEF DESCRIPTION OF THE DRAWINGS

The above and other objects, features and advantages of embodiments of the present invention will be more apparent from the following detailed description taken with reference to the accompanying drawings, in which.

DETAILED DESCRIPTION OF THE PREFERRED EMBODIMENT

Hereinbelow, a description will be given of a method of applying preload to the bearings of a head drum assembly of a tape recorder according to an embodiment of the present invention, and a head drum assembly having a preloading construction improved by applying the method in detail, with reference to accompanying drawings.

Figure 1:
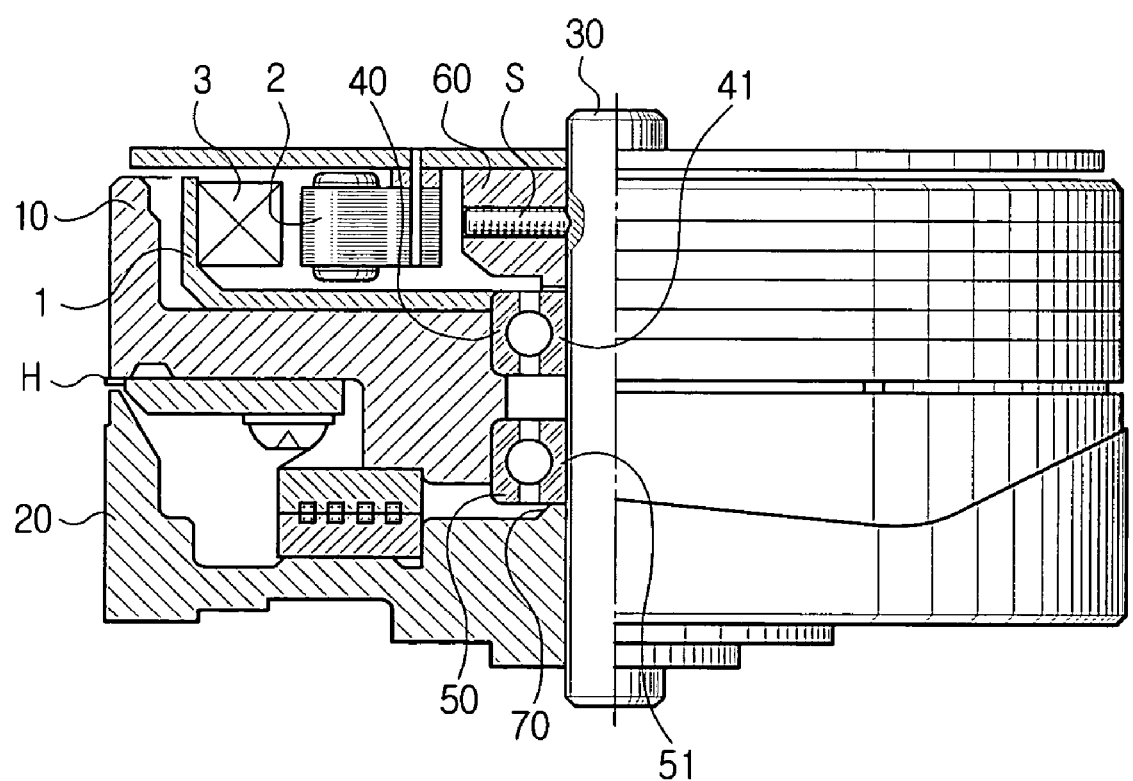
FIG. 1 is a partial cross-sectional schematic view of a conventional head drum assembly of a tape recorder.
Figure 2:
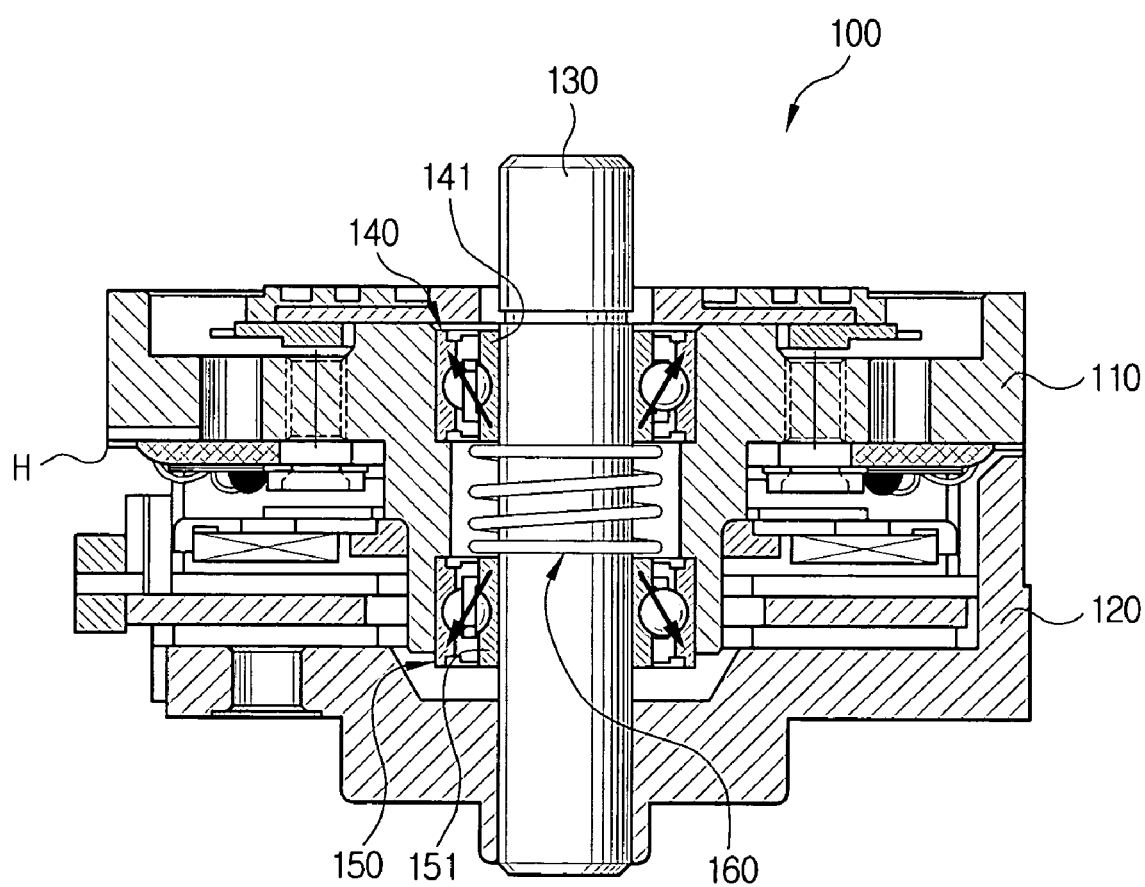
FIG. 2 is a cross-sectional schematic view of a head drum assembly of a tape recorder according to an embodiment of the present invention.

Referring to FIG. 2, the head drum assembly 100 of a tape recorder according to an embodiment of the present invention comprises: a rotary drum 110 which supports a magnetic head H for recording and reproducing information by scanning a running magnetic tape; a fixed drum 120, press-fitted onto the lower part of a shaft 130, engaged on an axial bore of the rotary drum 110, parallel to the rotary drum 110; an upper bearing 140 and a lower bearing 150, provided one on the other between the rotary drum 110 and the shaft 130; and preloading means for applying preload to the upper and lower bearings 140 and 150, wherein the preloading means comprises an elastic body 160 mounted on the circumferential surface of the shaft 130 and interposed between the upper and lower bearings 140 and 150 to elastically bias and compress each of the inner races 141 and 151 of the upper and lower bearings. One skilled in the art can appreciate that other ways of applying the preload to the upper and lower bearings 140 and 150 are equally within the scope of the invention. The head drum assembly of a tape recorder according to an embodiment of the present invention is improved in the preloading method and construction, and is characterized by the elastic body 160 being mounted on the circumferential surface of the shaft 130 located between the upper bearing 140 and the lower bearing 150. The elastic body 160 compresses the inner race 141 of the upper bearing 140 and the inner race 151 of the lower bearing 150 upward and downward, respectively, whereby preload can be applied to each of the upper and lower bearings 140 and 150 in the directions indicated by arrows.

Meanwhile, according to a further aspect of the illustrated embodiment of the present invention, the elastic body 160 can be formed from a compression coil spring. However, the embodiments of the present invention are not limited to this particular example, and can employ various types of elastic bodies which can compress the inner race of the upper bearing and the inner race of the lower bearing upwardly and downwardly, respectively.

A description will now be given of the method of applying preload to the bearings of the head drum assembly according to an embodiment of the present invention, with reference to FIGS. 3A to 3E.

Figure 3A:
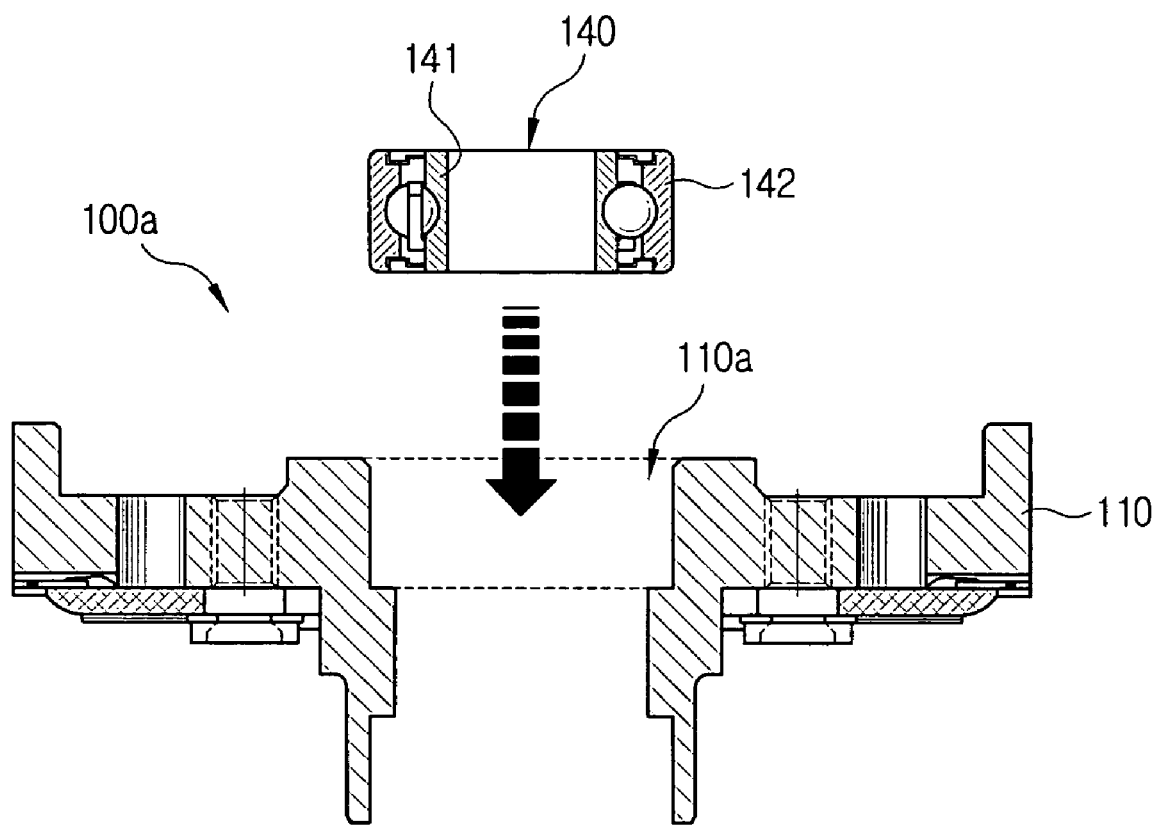
FIGS. 3A to 3E illustrate a method of assembling the head drum assembly which illustrates a preloading method of the bearings of the head drum assembly according to an embodiment of the present invention.

Initially, the upper bearing 140 is vertically downwardly and forcibly press-fitted into a recess 110a formed in the central part of the top surface of the rotary bearing 110, thereby forming a first assembly 100a as shown in FIG. 3A. Here, the outer race 142 of the upper bearing 140 comes into close contact with the internal circumferential surface of the recess 110a and is upwardly compressed. Therefore, the upper bearing is maintained in the finely raised state.

Figure 3B:
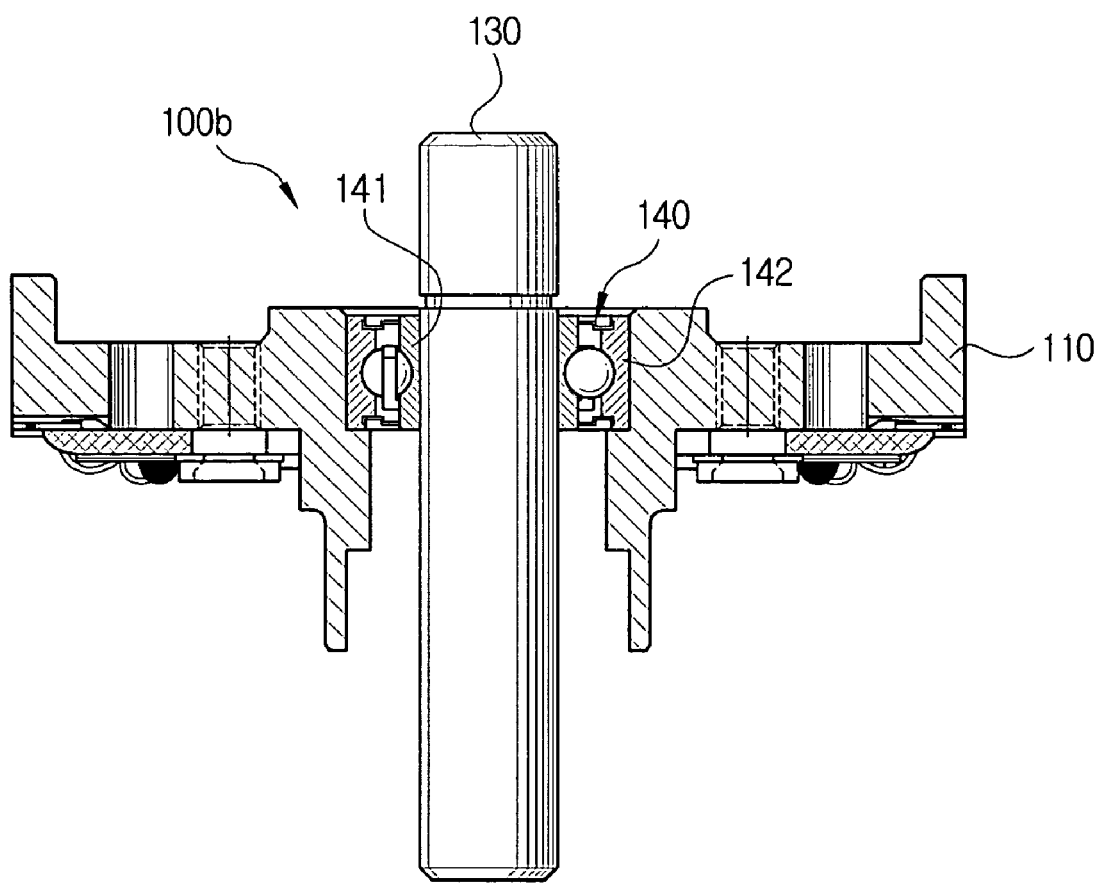

As shown in FIG. 3B, the shaft 130 is then fitted into the upper bearing 140 of the first assembly 100a, thereby forming a second assembly 100b.

According to an embodiment of the present invention, the outer diameter of the shaft 130 is somewhat larger than the inner diameter of the inner race 141 of the upper bearing 140. Therefore, the inner race 141 of the upper bearing 140 is tightly fitted and bonded to the outer diameter of the shaft 130.

Figure 3C:
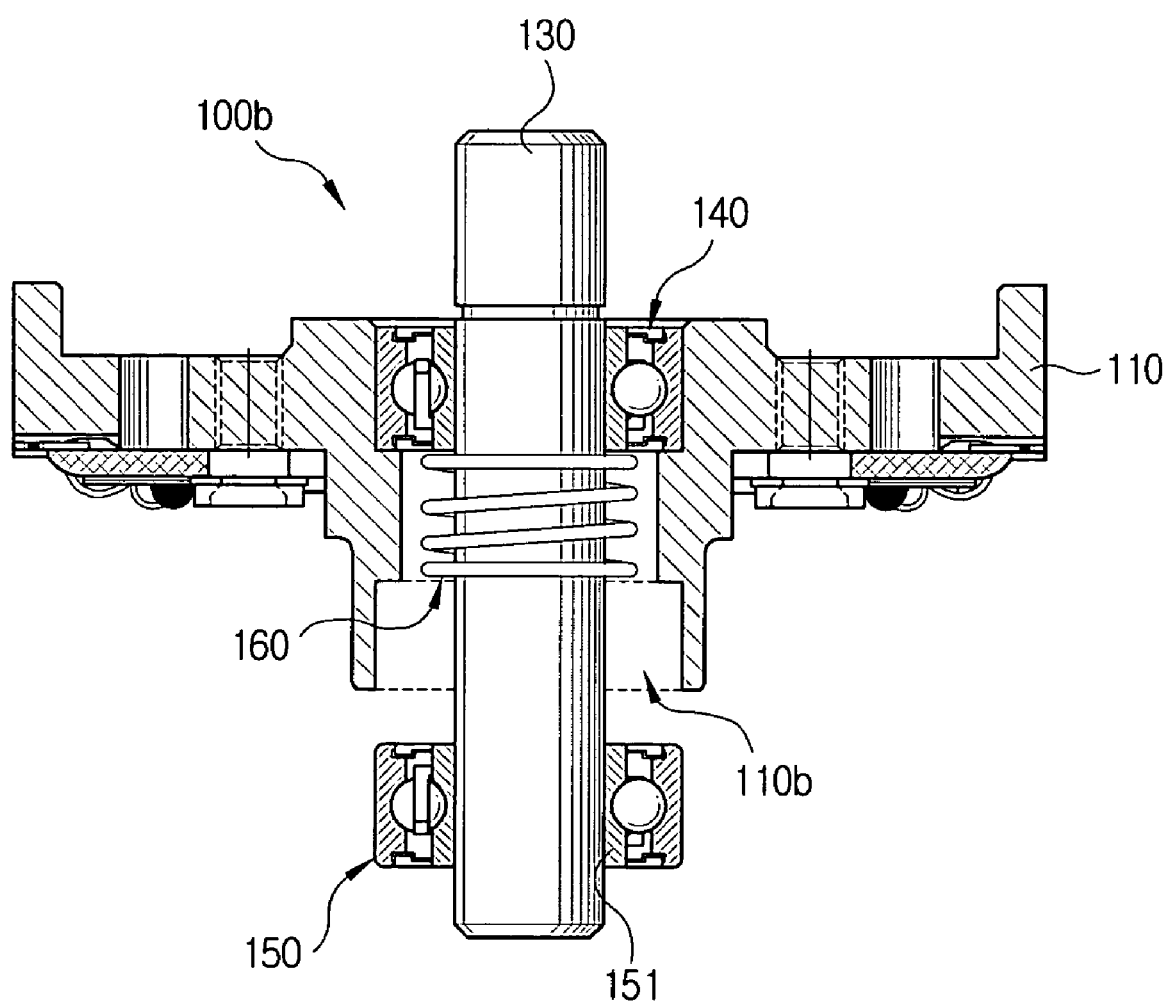
Figure 3D:
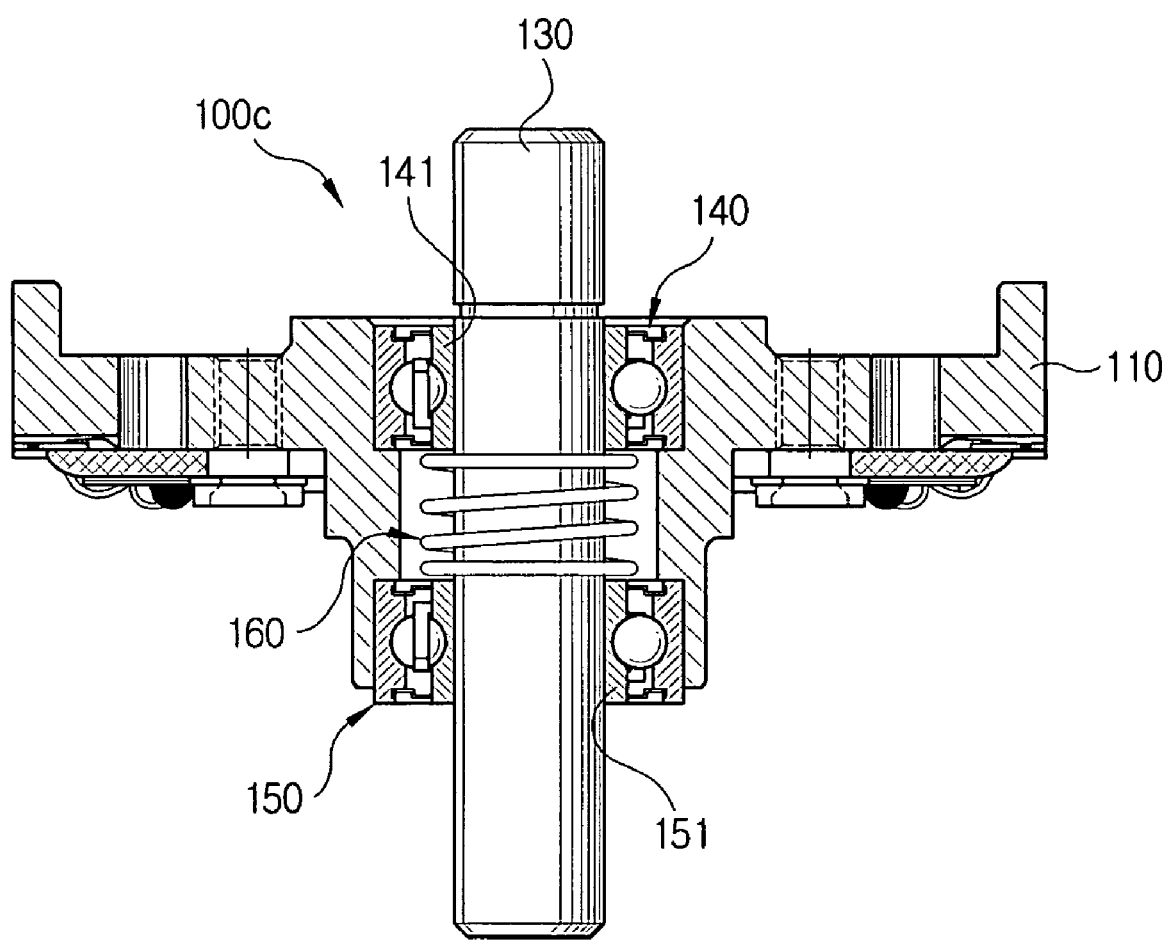

After the second assembly 100b is formed, the inner race 141 and outer race 142 remain in a positionally unbalanced state. Therefore, as shown in FIGS. 3C and 3D, the elastic body 160, e.g., a compression coil spring, is then installed as a preloading means in order to remove the unbalanced state. The elastic body 160 is installed to support and elastically bias the inner race 141 of the upper bearing 140 upwardly, as shown in FIG. 3C. The lower bearing 150 is fitted into the lower part of the rotary drum 110, so that the inner race 151 of the lower bearing 150 supports the lower end of the elastic body 160 as shown in FIG. 3D. As a result, a third assembly 100c is formed.

In the process of forming the third assembly 100c, the lower bearing 150 is press-fitted onto the shaft 130 and then press-fitted into a recess 122 formed in the central part of the bottom surface of the rotary drum 110. Here, the inner race 151 of the lower bearing 150 comes into close contact with the circumferential outer surface of the shaft and the elastic body 160 compresses and elastically biases the inner race 151 downwardly. As such, the elastic body 160 respectively compresses the inner race 141 of the upper bearing 140 and the inner race 151 of the lower bearing 150 upwardly and downwardly, respectively, as a result of which preload is applied to the upper bearing 140 and lower bearing 150 in the directions indicated by arrows (shown in FIG. 2).

Figure 3E:
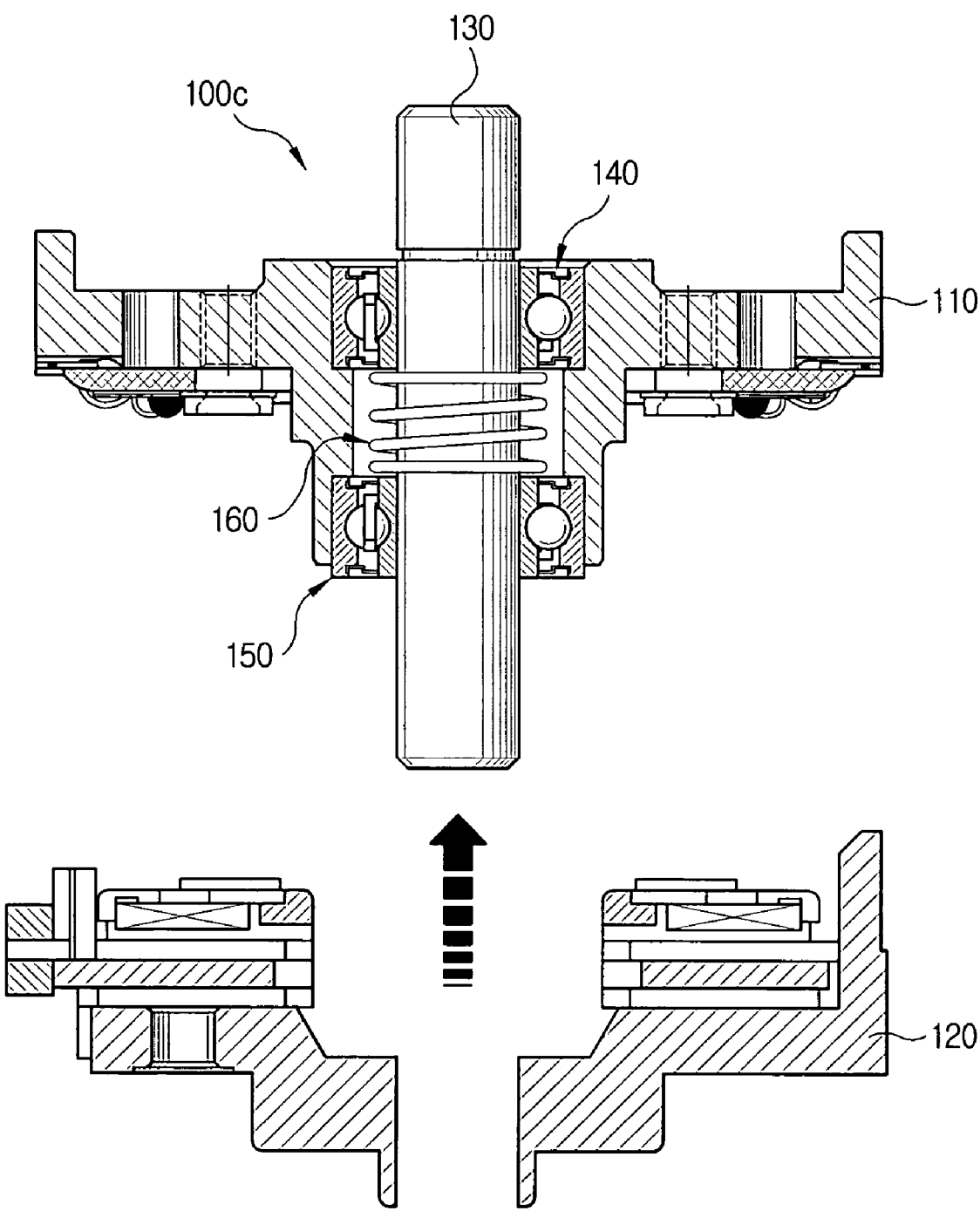

Finally, referring to FIG. 3E, the fixed drum 120 is press-fitted onto the shaft 130 and thus positioned below the rotary drum 110 of the third assembly 100c. In this manner, the head drum assembly, to which the preloading method and construction according to an embodiment of the present invention are applied, is completed.

As described above, it becomes possible to remove a preloading boss and a screw for securing the boss required in the conventional construction of a head drum assembly of a tape recorder by utilizing the bearing preloading construction in accordance with an embodiment of the present invention. Furthermore, it is also possible to omit an annealing step for removing thermal deformation caused in the conventional construction due to the excessive press-fitting of the bearings components to be assembled, and to exclude the related assembling steps. Consequently, by constructing a head drum assembly according to an embodiment of the present invention, one or more manufacturing steps are eliminated with the attendant costs saved.

While the invention has been shown and described with reference to an embodiment thereof, the present invention is not limited to the embodiment described above and variant embodiments can be made by those skilled in the art without departing from the spirit and scope of the invention as defined by the appended claims.

The invention claimed is:

1. A head drum assembly of a tape recorder, comprising:
    a shaft;
    a rotary drum which supports a magnetic head for recording and reproducing information by scanning a running magnetic tape, the rotary drum having an axial bore with an upper recess and lower recess;
    a fixed drum, press-fined onto a lower part of the shaft, engaged on the axial bore of the rotary drum, parallel to the rotary drum;
    an upper bearing having an inner race and an outer race, the outer race being press-fit into the upper recess of the axial bore of the rotary drum, the inner race being press-fit around the shaft;
    a lower bearing having an inner race and an outer race, the outer race being press-fit into the lower recess of the axial bore of the rotary drum, the inner race being press-fit around the shaft; and
    an elastic body mounted on the circumferential surface of the shaft between the inner races of the upper and lower bearings, the elastic body directly contacting the inner races to generate a preload force at a predetermined angle with respect to the shaft.

2. The head drum assembly of a tape recorder according to claim 1, wherein the elastic body comprises a coil spring.

3. The head drum assembly of a tape recorder according to claim 1, wherein the predetermined angle is approximately 30°.

4. A head drum assembly of a tape recorder, comprising:
    a shaft;
    a rotary drum which supports a magnetic head for recording and reproducing information by scanning a running magnetic tape, the rotary drum having an axial bore with an upper recess and lower recess;

a fixed drum, press-fitted onto a lower part of the shaft, engaged on an axial bore of the rotary drum, parallel to the rotary drum;

an upper bearing having an inner race and an outer race, the outer race being press-fit into the upper recess of the axial bore of the rotary drum, the inner race being press-fit around the shaft;

a lower bearing having an inner race and an outer race, the outer race being press-fit into the lower recess of the axial bore of the rotary drum, the inner race being press-fit around the shaft; and an elastic body for generating a preload force which is directed at a predetermined angle from the shaft on the inner races of the bearings.

5. The head drum assembly of a tape recorder according to claim 4, wherein the elastic body comprises a coil spring.

6. The head drum assembly of a tape recorder according to claim 5, wherein the preload is applied to the inner race of the lower bearing in a downward direction.

7. The head drum assembly of a tape recorder according to claim 4, wherein the predetermined angle is approximately 30°.

8. The head drum assembly of a tape recorder according to claim 5, wherein the preload is applied to the inner race of the upper bearing in an upward direction.

9. The head drum assembly of a tape recorder according to claim 8, wherein the coil spring directly contacts the inner race of the upper bearing without contacting the outer race of the upper bearing.

10. The head drum assembly of a tape recorder according to claim 6, wherein the coil spring directly contacts the inner race of the lower bearing without contacting the outer race of the lower bearing.

11. A head drum assembly of a tape recorder, comprising:
a shaft;

a rotary drum which supports a magnetic head for recording and reproducing information by scanning a running magnetic tape, the rotary drum having an axial bore with an upper recess and lower recess;

a fixed drum, press-fitted onto a lower part of the shaft, engaged on an axial bore of the rotary drum, parallel to the rotary drum;

an upper bearing having an inner race and an outer race, the outer race being press-fit into the upper recess of the axial bore of the rotary drum, the inner race being press-fit around the shaft;

a lower bearing having an inner race and an outer race, the outer race being press-fit into the lower recess of the axial bore of the rotary drum, the inner race being press-fit around the shaft; and means for generating a preload force which is directed at a predetermined angle from the shaft on the inner races of the bearings.

12. The head drum assembly of a tape recorder according to claim 11, wherein the means for generating a preload force comprises a coil spring.

13. The head drum assembly of a tape recorder according to claim 12, wherein the coil spring directly contacts the inner race of the upper bearing to generate a preload force in an upward direction.

14. The head drum assembly of a tape recorder according to claim 13, wherein the coil spring directly contacts the inner race of the lower bearing to generate a preload force in an downward direction.

15. The head drum assembly of a tape recorder according to claim 14, wherein the predetermined angle is approximately 30°.

* * * * *